United States Patent
Li

(10) Patent No.: US 10,017,075 B2
(45) Date of Patent: Jul. 10, 2018

(54) DEVICE FOR CONTROLLING ELECTRIC AUTOMOBILE

(71) Applicant: Guodong Li, Fuji (JP)

(72) Inventor: Guodong Li, Fuji (JP)

(73) Assignee: NTN CORPORATION, Osaka (JP)

( * ) Notice: Subject to any disclaimer, the term of this patent is extended or adjusted under 35 U.S.C. 154(b) by 78 days.

(21) Appl. No.: 14/943,743

(22) Filed: Nov. 17, 2015

(65) Prior Publication Data

US 2016/0068081 A1 Mar. 10, 2016

Related U.S. Application Data

(63) Continuation of application No. PCT/JP2014/063000, filed on May 15, 2014.

(30) Foreign Application Priority Data

May 20, 2013 (JP) .................. 2013-105987

(51) Int. Cl.
*B60L 15/20* (2006.01)
*G05B 11/42* (2006.01)
(Continued)

(52) U.S. Cl.
CPC ............ *B60L 15/2045* (2013.01); *B60L 7/10* (2013.01); *B60L 15/02* (2013.01); *B60L 15/025* (2013.01);
(Continued)

(58) Field of Classification Search
None
See application file for complete search history.

(56) References Cited

U.S. PATENT DOCUMENTS 5,747,957 A 5/1998 Hayashida
6,333,612 B1 12/2001 Suzuki et al.
(Continued)

FOREIGN PATENT DOCUMENTS

CN 101007510 A 8/2007
CN 101223685 A 7/2008
(Continued)

OTHER PUBLICATIONS

Chinese Office Action dated Oct. 27, 2016 in corresponding Chinese Patent Application No. 201480028841.1.
(Continued)

*Primary Examiner* — Mussa A Shaawat
*Assistant Examiner* — Kyung J Kim

(57) ABSTRACT

A control device for an electric vehicle improving the responsiveness of a motor and leading to improvement in occupant's riding comfort during power running and regenerative control of the motor. A motor control module includes: a current PI control section to perform PI feedback control to eliminate a deviation relative to a command current value generated in an inverter, in response to a torque command from an ECU; PI control gain adjustment tables, for power running and regenerative control, in which a PI control gain used when the current PI control section performs the PI feedback control is set in accordance with a running state; and a control gain adjustment section to adjust the PI control gain according to the PI control gain adjustment table such that a PI control gain corresponding to the running state is used.

5 Claims, 8 Drawing Sheets

(51) Int. Cl.
  *H02P 23/00* (2016.01)
  *B60L 7/10* (2006.01)
  *B60L 15/02* (2006.01)

(52) U.S. Cl.
  CPC .............. *B60L 15/20* (2013.01); *G05B 11/42* (2013.01); *H02P 23/0004* (2013.01); *B60L 2240/12* (2013.01); *B60L 2240/421* (2013.01); *B60L 2240/423* (2013.01); *B60L 2240/429* (2013.01); *B60L 2260/42* (2013.01); *Y02T 10/643* (2013.01); *Y02T 10/72* (2013.01); *Y02T 10/7283* (2013.01)

(56) References Cited

U.S. PATENT DOCUMENTS

| | | | |
|---|---|---|---|
| 7,629,755 | B2 | 12/2009 | Yaguchi |
| 8,497,645 | B2 | 7/2013 | Shimada et al. |
| 9,031,724 | B2 | 5/2015 | Ozaki |
| 2008/0143281 | A1 | 6/2008 | Yaguchi |
| 2011/0127933 | A1 | 6/2011 | Shimada et al. |
| 2011/0163709 | A1* | 7/2011 | Dai ................ H02P 21/06 318/812 |
| 2013/0293163 | A1* | 11/2013 | Flett ............... H02P 27/08 318/139 |
| 2013/0338866 | A1 | 12/2013 | Ozaki | |

FOREIGN PATENT DOCUMENTS

| | | |
|---|---|---|
| CN | 102577093 | 7/2012 |
| JP | 63-316687 | 12/1988 |
| JP | 09-093971 | 4/1997 |
| JP | 09-149685 | 6/1997 |
| JP | 09-294388 | 11/1997 |
| JP | 2001-112108 | 4/2001 |
| JP | 2004-116467 | 4/2004 |
| JP | 2004-187379 | 7/2004 |
| JP | 2006-074885 | 3/2006 |
| JP | 2007-026700 | 2/2007 |
| JP | 2009-112163 | 5/2009 |
| JP | 2012-178919 | 9/2012 |

OTHER PUBLICATIONS

Zhao et al., "Fuzzy Gain Scheduling of PID Controllers", IEEE Transactions on Systems, Man, and Cybernetics, Vo. 23, No. 5, IEEE Sep./Oct. 1993, pp. 1392-1398.
Extended European Search Report dated Jan. 3, 2017 in corresponding European Patent Application No. 14800264.5.
International Search Report dated Aug. 12, 2014 in corresponding international application PCT/JP2014/063000.
International Preliminary Report on Patentability dated Dec. 3, 2015 in corresponding International Patent Application No. PCT/JP2014/063000.
Japanese Office Action dated Mar. 21, 2017 from Japanese Patent Application No. 2013-105987, 4 pages.
Chinese Office Action dated Jul. 4, 2017 in related Chinese Patent Application 201480028841.1.
Office Action dated Dec. 6, 2017 in related European Patent Application No. 14 800 264.5, 5 pgs.

\* cited by examiner

DEVICE FOR CONTROLLING ELECTRIC AUTOMOBILE

CROSS REFERENCE TO THE RELATED APPLICATION

This application is a continuation application, under 35 U.S.C. § 111(a), of international application No. PCT/JP2014/063000, filed May 15, 2014, which is based on and claims Convention priority to Japanese patent application No. 2013-105987, filed May 20, 2013, the entire disclosure of which is herein incorporated by reference as a part of this application.

BACKGROUND OF THE INVENTION

Field of the Invention

The present invention relates to, for example, a control device for a four-wheel electric vehicle including an in-wheel motor drive device, and particularly relates to a technique to automatically adjust a motor control gain, thereby suppressing overshoot in torque control, improving motor responsiveness, and also reducing vibration of a cycloidal reducer disposed between a wheel bearing and a motor.

Description of Related Art

For example, as conventional art 1, an electric vehicle has been proposed which includes, as drive wheels, right and left wheels driven by independent traction motors, respectively (Patent Document 1). Rotation of each motor is transmitted via a reducer or reduction gear and a wheel bearing to the corresponding wheel. The motor, the reducer, and the wheel bearing are integrally assembled with each other to form an in-wheel motor drive device.

RELATED DOCUMENT

Patent Document

[Patent Document 1] JP Laid-open Patent Publication No. 2012-178919
[Patent Document 2] JP Laid-open Patent Publication No. 2004-116467

Conventional Art 1 (Electric Vehicle)

In conventional art 1, during start of the vehicle, or during acceleration (during power running control), the motors are driven through torque control. A PI (Proportional and Integral) control gain value which is used for the torque control of the motors is a constant. Thus, if the PI control gain is set high, a phenomenon occurs that the torque exceeds a command torque. This phenomenon is referred to as overshoot. If overshoot occurs, a cycloidal reducer disposed between a wheel bearing and the motor is likely to vibrate. This deteriorates occupant's riding comfort. In addition, in an inverter device which controls each motor, there is a possibility that a large current flows to a driver of a power circuitry, and thus abnormality is likely to occur in the inverter device. Similarly, this problem exists during deceleration of the vehicle (during regenerative control).

In order to avoid an overshoot phenomenon, for example, there is means for setting the PI control gain to be low, or means for alleviating command torque from an ECU by providing a low-pass filter for the command torque. Thus, a problem arises that the responsiveness of the motor decreases.

Conventional Art 2 (Engine Vehicle)

As conventional art 2, in a feedback control system for a variable nozzle turbine (VNT) for an engine, a method for automatically adjusting a PID (P: Proportional, I: Integral, D: Differential) gain for feedback control has been proposed (Patent Document 2). In this method, if an overshoot value of an actual value relative to a target value exceeds a predetermined value, a feedback PID gain obtained from a deviation is changed to a low value in calculation. This method is able to appropriately suppress overshoot, but cannot avoid overshoot.

SUMMARY OF THE INVENTION

An object of the present invention is to provide a control device for an electric vehicle which control device improves the responsiveness of a motor and leads to improvement in occupant's riding comfort during power running control of the motor and during regenerative control of the motor in the electric vehicle.

Hereinafter, in order to facilitate understanding of the present invention, the present invention will be described with reference to the reference numerals in embodiments for the sake of convenience.

A control device for an electric vehicle according to the present invention includes: an ECU 21 which is an electric control unit configured to perform general control of the vehicle; and an inverter device 22 including: a power circuitry 28 with an inverter 31 configured to convert a DC power to an AC power used to drive a traction motor 6; and a motor control module 29 configured to control the power circuitry 28 in accordance with control of the ECU 21. The motor control module 29 includes:
  a current PI control section 41 configured to perform PI feedback control so as to eliminate a deviation relative to a command current value generated in the inverter, in response to a torque command from the ECU 21;
  PI control gain adjustment tables 35, for power running control and for regenerative control, in which a PI control gain used when the current PI control section 41 performs the PI feedback control is set in accordance with a running state; and
  a control gain adjustment section 34 configured to adjust the PI control gain of the current PI control section 41 according to the PI control gain adjustment table 35 such that the PI control gain corresponding to the running state is used.

The "running state" refers to, for example, a state determined on the basis of a relationship between a vehicle speed and the absolute value of the deviation between the command current value and a measured current value of the traction motor 6.

According to this configuration, for example, the motor control module 29 controls the power circuitry 28 on the basis of the accelerating/decelerating command, which is the torque command or the like sent from the ECU 21, during motor power running and regenerative control, and executes output control of the motor 6 through torque control. That is, the current PI control section 41 in the motor control module 29 performs PI feedback control so as to eliminate a deviation relative to the command current value generated in the inverter, in response to the torque command from the ECU 21. Since the PI control gain adjustment tables 35 which are used during the PI feedback control are provided for power running control and for regenerative control, respectively, disturbance caused due to, for example, a distinction in performance or a deterioration state of the battery 19, a distinction in loss of the motor 6 and the inverter device 22, or the like, is less influential, and it is possible to more accurately control the motor 6 regardless of power running control or regenerative control. Therefore, it is possible to improve the responsiveness of the motor 6.

The control gain adjustment section 34 adjusts the PI control gain of the current PI control section 41 according to the PI control gain adjustment table 35 such that the PI control gain corresponding to the running state is used. Since the PI control gain is optimally adjusted in accordance with the running state which changes every moment, an overshoot phenomenon can be avoided to, for example, suppress vibration of the reducer and the like. Thus, it is possible to improve the occupant's riding comfort.

The respective PI control gain adjustment tables 35 for power running control and for regenerative control may be provided for a preset interval determined with respect to a vehicle speed. In each of the PI control gain adjustment tables 35, as an absolute value of a deviation between the command current value and a measured current value of the motor 6 decreases, an integral gain in the PI control gain may be decreased, and a proportional gain may be decreased at the same time; and as the absolute value of the deviation increases, the integral gain may be increased, and the proportional gain may be increased at the same time.

The PI control gain adjustment table 35 is set as described above on the basis of results of an actual vehicle test, or the like. Since the integral gain and the proportional gain are decreased as the absolute value of the deviation decreases, it is possible to suppress overshoot in current control. On the other hand, since the integral gain and the proportional gain are increased as the absolute value of the deviation increases, it is possible to make the responsiveness of the motor 6 quicker. As described above, it is possible to achieve both suppression of overshoot in current control and improvement of the responsiveness of the motor 6.

A limit may be provided by the control gain adjustment section 34 for a gain manipulation amount for manipulating the proportional gain or the integral gain, and if the gain manipulation amount exceeds the limit, the control gain adjustment section 34 may use the limit as an upper limit. In this case, for example, it is possible to prevent an excessively large current from flowing to a PWM driver 32 of the power circuitry 28, thereby preventing abnormality occurrence of the inverter device 22.

A limit may be provided for a command current value which corresponds to a value of current flowing to the motor 6 during power running control or of current flowing to the motor 6 during regenerative control. In this case, for example, it is possible to reduce influence of disturbance or temperature rise of the motor 6. Therefore, it is possible to prevent abnormality occurrence of the motor 6 which is caused due to temperature rise of the motor 6 or the like.

The motor 6 may constitute an in-wheel motor drive device 8 which is partly or entirely disposed within a wheel and includes the motor 6, a wheel bearing 4, and a reducer or reduction gear 7.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIGS. 7A and 7B are diagrams showing an example before and after improvement in overshoot during power running control; and FIGS. 8A and 8B are diagrams showing an example before and after improvement in overshoot during regenerative control.

DESCRIPTION OF EMBODIMENTS

Figure 1:
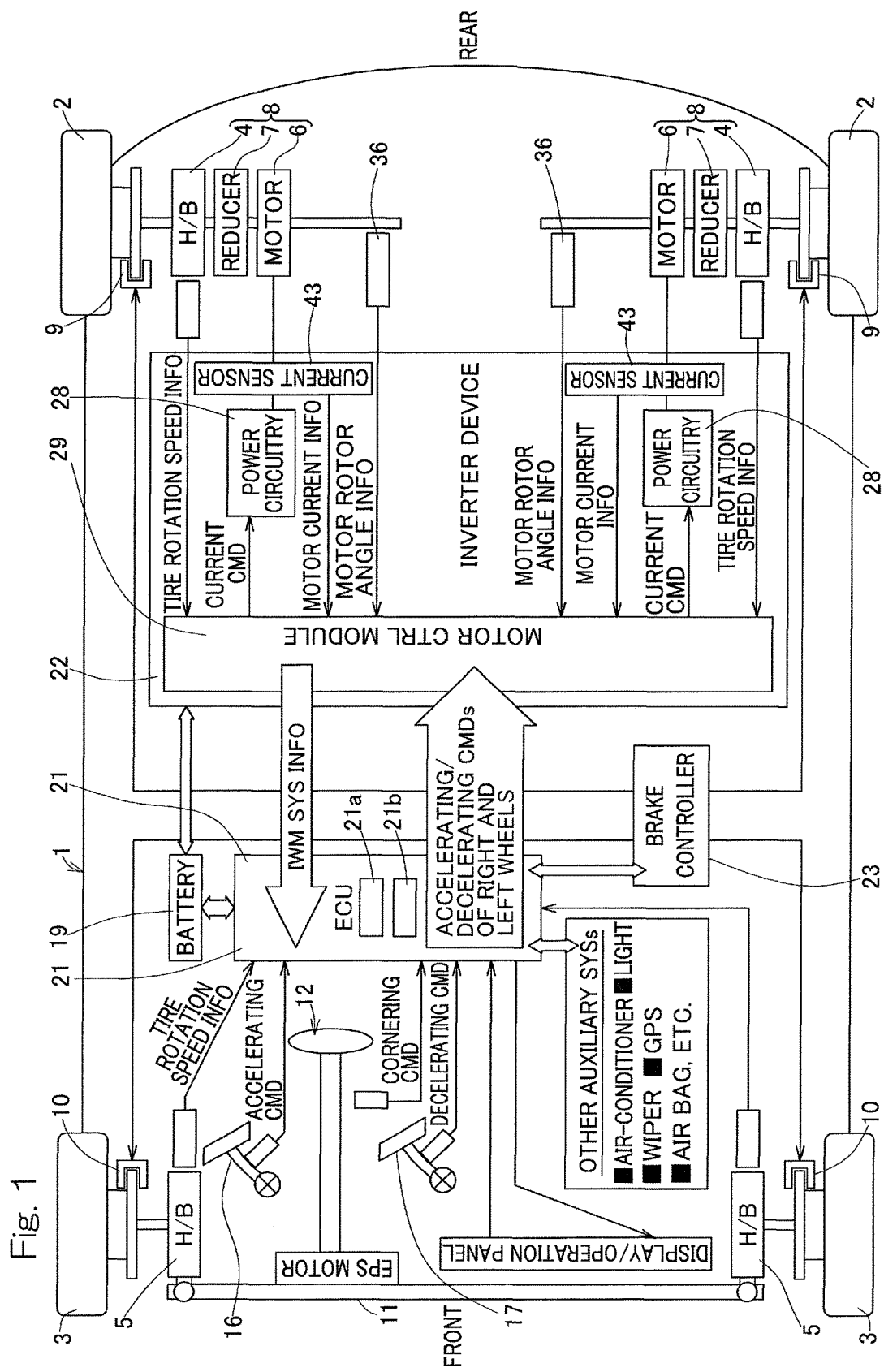
FIG. 1 is a block diagram of a schematic configuration showing an electric vehicle according to a first embodiment of the present invention in a plan view.

A control device for an electric vehicle according to a first embodiment of the present invention will be described with reference to FIGS. 1 to 8. The following description also includes a description of a method for controlling the electric vehicle. FIG. 1 is a block diagram of a schematic configuration showing the electric vehicle according to the embodiment in a plan view. As shown in FIG. 1, the electric vehicle is a four-wheel vehicle which includes a vehicle body 1 with right and left rear wheels 2 as drive wheels and with right and left front wheels 3 as driven wheels which are steering wheels. The drive wheels 2 and the driven wheels 3 are both equipped with tires and are supported by the vehicle body 1 via respective wheel bearings 4 and 5.

In FIG. 1, the wheel bearings 4 and 5 are labeled with "H/B" which is an abbreviation for hub bearing. The right and left drive wheels 2 are driven by respective independent traction motors 6. Rotation of each motor 6 is transmitted via a reducer 7 and the wheel bearing 4 to the corresponding wheel 2. The motor (IWM: In-Wheel Motor) 6, the reducer 7, and the wheel bearing 4 are integrally assembled with each other to form an in-wheel motor drive device 8. The in-wheel motor drive device 8 is partly or entirely disposed within the wheel 2. The reducer 7 is, for example, a cycloidal reducer. The wheels 2 and 3 are equipped with respective electromechanical brakes 9 and 10. The steering wheels 3, which are the right and left front wheels, can be turned via a turning mechanism 11 and are steered with a steering portion 12 which is a steering wheel or the like.

Figure 2:
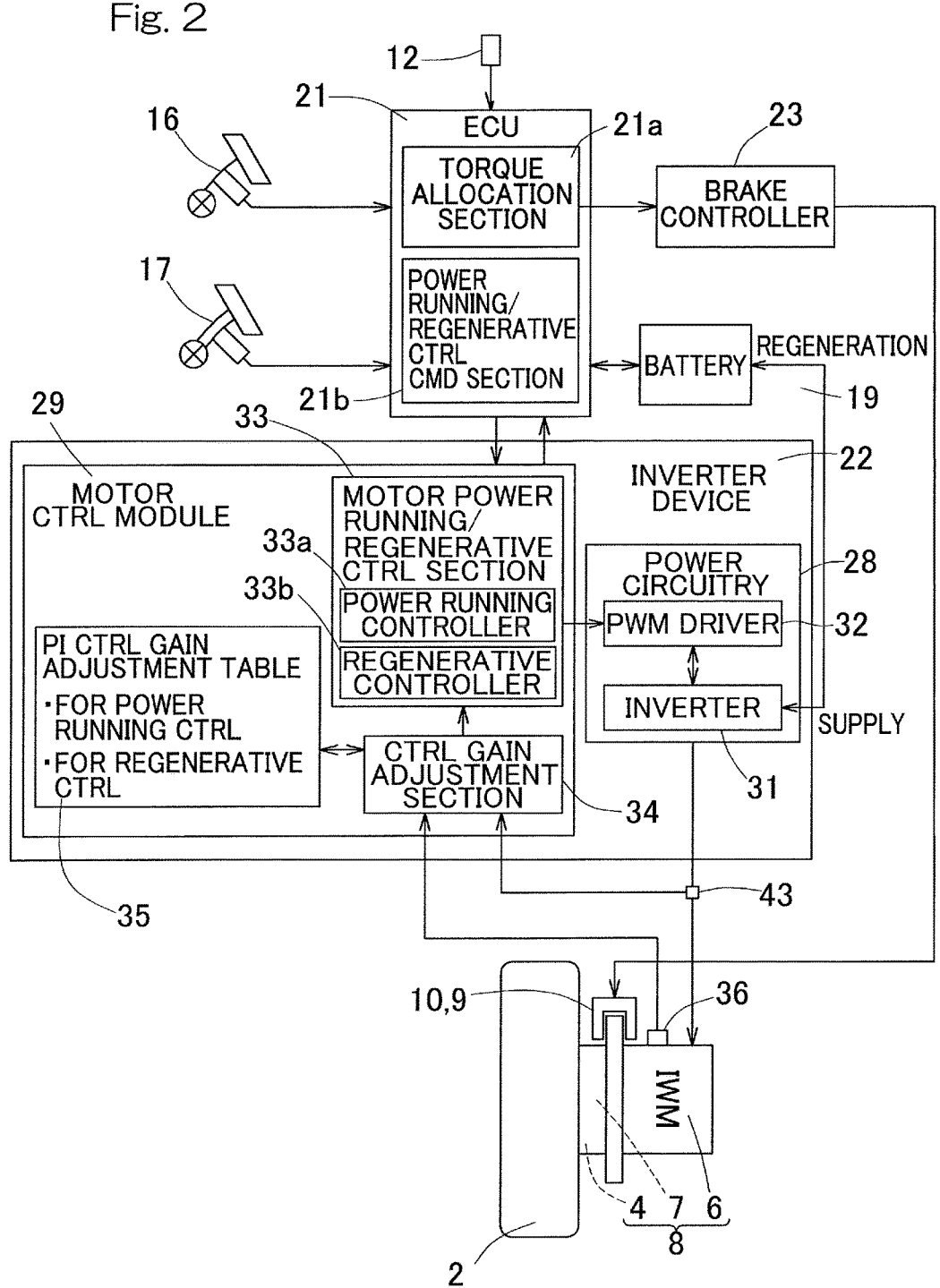
FIG. 2 is a block diagram of a schematic configuration showing a relationship of an inverter device and the like of the electric vehicle.

FIG. 2 is a block diagram of a schematic configuration of an inverter device and the like of the electric vehicle. As shown in FIG. 2, the electric vehicle includes an ECU 21 which is an electric control unit configured to perform general control of the vehicle, and an inverter device 22 configured to perform control of the traction motors 6 according to commands from the ECU 21. The ECU 21 includes a computer, programs which are executed by the computer, and various electronic circuits. The ECU 21 includes a torque allocation section 21a and a power running/regenerative control command section 21b.

The torque allocation section 21a is configured to generate an accelerating/decelerating command as a torque command value, which is to be sent to the traction motors 6, 6 of the right and left wheels, on the basis of an accelerating command outputted from accelerator manipulation portion 16 such as an accelerator pedal, a decelerating command outputted from brake manipulation portion 17 such as a brake pedal, and a cornering or steering command from the steering portion 12, and to output the accelerating/decelerating command to each inverter device 22. In addition, the torque allocation section 21a has a function to, in response to a decelerating command outputted from the brake manipulation portion 17, generate a braking torque command value allocated to regenerative braking of the motor 6 and a braking torque command value allocated to the operation of the electromechanical brakes 9 and 10. The braking torque command value allocated to regenerative braking reflects the accelerating/decelerating command which is to be sent to the motors 6 of the right and left wheels to a torque command value. The braking torque command value allocated to the operation of the brakes 9 and 10 is outputted to a brake controller 23. The power running/regenerative control command section 21b is configured to send a command flag for switching between acceleration (power running) and deceleration (regeneration), to a motor power running/regenerative control section 33 of a motor control module 29 described later.

The inverter device 22 includes a power circuitry 28 provided for each motor 6, and the motor control module 29 configured to control the power circuitry 28. The power circuitry 28 includes an inverter 31 configured to convert a DC power from a battery 19 into a three-phase AC power used for power running and regeneration of the motor 6, and a PWM driver 32 configured to control the inverter 31. The motor 6 is, for example, a three-phase synchronous motor. The motor 6 is provided with a rotation angle sensor 36 configured to detect a rotation angle as an electrical angle of a rotor of the motor. The inverter 31 includes a plurality of semiconductor switching elements, and the PWM driver 32 performs pulse width modulation of an inputted current command and sends ON/OFF commands to each of the semiconductor switching elements.

The motor control module 29 includes a computer, programs which are executed by the computer, and various electronic circuits. The motor control module 29 includes the motor power running/regenerative control section 33 as a basic control section, a control gain adjustment section 34, and a PI control gain adjustment table 35. The motor power running/regenerative control section 33 is configured to perform conversion of an accelerating (power running)/decelerating (regeneration) command such as a torque command sent from the ECU 21 as a primary control unit to a current command, and to send the current command to the PWM driver 32 of the power circuitry 28. Switching between power running and regeneration, that is, switching of the direction of a command current, is performed on the basis of the command flag from the power running/regenerative control command section 21b of the ECU 21. The motor power running/regenerative control section 33 includes power running controller 33a and regenerative controller 33b, and either the power running controller 33a or the regenerative controller 33b is selectively used on the basis of the command flag from the power running/regenerative control command section 21b.

The motor power running/regenerative control section 33 generates an appropriate command current value in accordance with the direction of the command current instructed with the command flag, by using a torque table (not shown) which is preset in the inverter. At that time, a current PI control section 41 (FIG. 4) described later performs PI feedback control so as to eliminate a deviation relative to the command current value generated in the inverter, in response to the torque command from the ECU 21. In addition, the motor power running/regenerative control section 33 obtains the rotation angle of the rotor of the motor 6 from the rotation angle sensor 36 via the control gain adjustment section 34 described next, and performs control corresponding to the rotation angle, such as vector control.

The control gain adjustment section 34 adjusts a PI control gain of the current PI control section 41 (FIG. 4) according to the PI control gain adjustment table 35 described later, such that a PI control gain corresponding to a running state is used. In the motors 6 that drive the right and left rear wheels 2 on the vehicle body 1, torque generation directions are different from each other between during power running and during regeneration. That is, during power running, as seen from the direction of an output shaft of each motor 6, torque in the CW direction is generated in the motor 6 at the left side, and torque in the CCW direction is generated in the motor 6 at the right side. The left side and the right side regarding the motors 6 are determined by the direction in which the vehicle is seen from the rear side (the same applies below).

The torque generated in each of the motors at the right and left sides is transmitted via the cycloidal reducer 7 and the wheel bearing 4 to the tire while the direction of the torque at one side (the right side or the left side) is reversed. In addition, in the motors 6 of the right and left tires, the direction of torque generated during regeneration is different from the direction of torque generated during power running. To perform power running control and regenerative control, the PI control gain is automatically adjusted, which improves the responsiveness of each motor 6 and leads to improvement in occupant's riding comfort. Signal communication among the ECU 21, the inverter device 22, the brake controller 23, and the steering portion 12 is performed, for example, with controller area network (CAN) communication.

Figure 3:
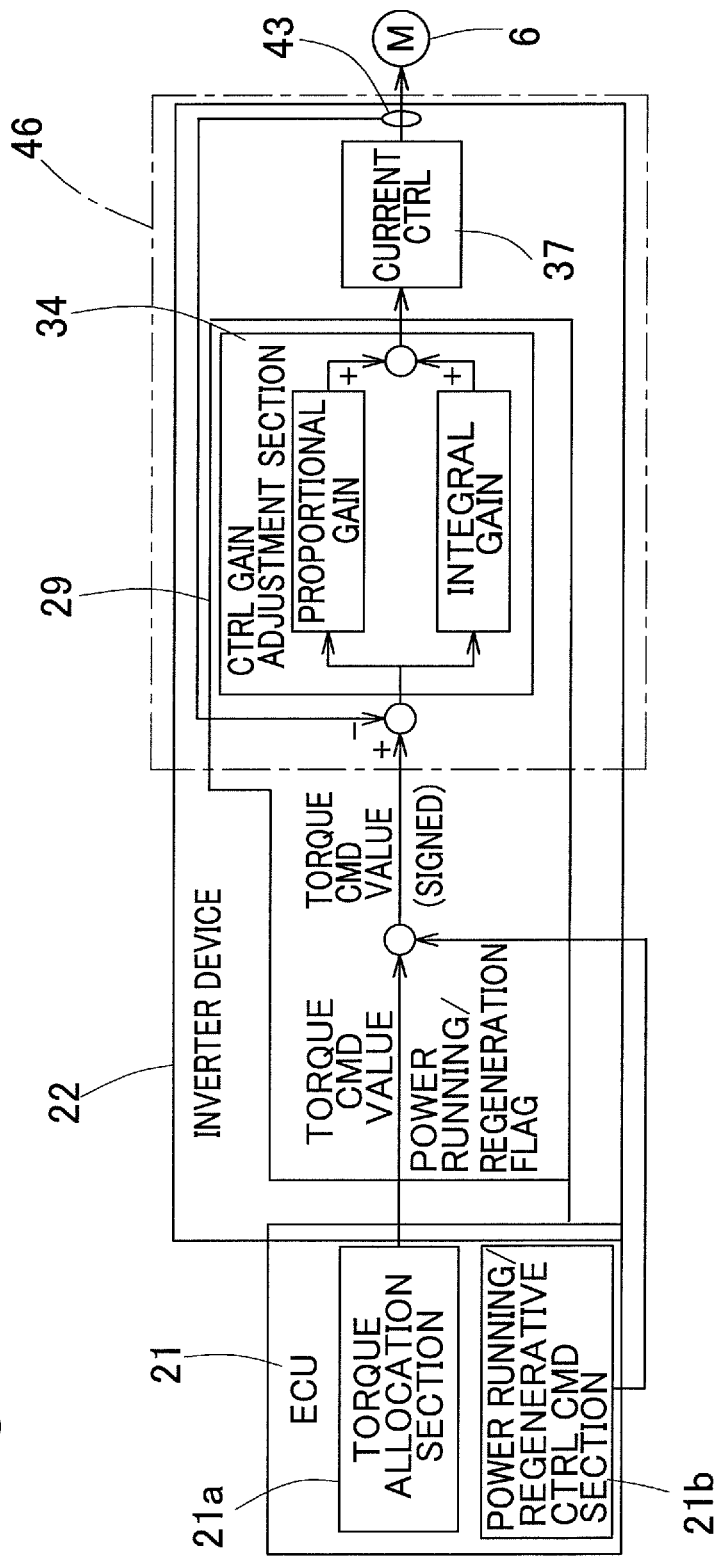
FIG. 3 is a block diagram of a torque control system by a motor control module and the like, including a control gain adjustment section in the inverter device.
Figure 4:
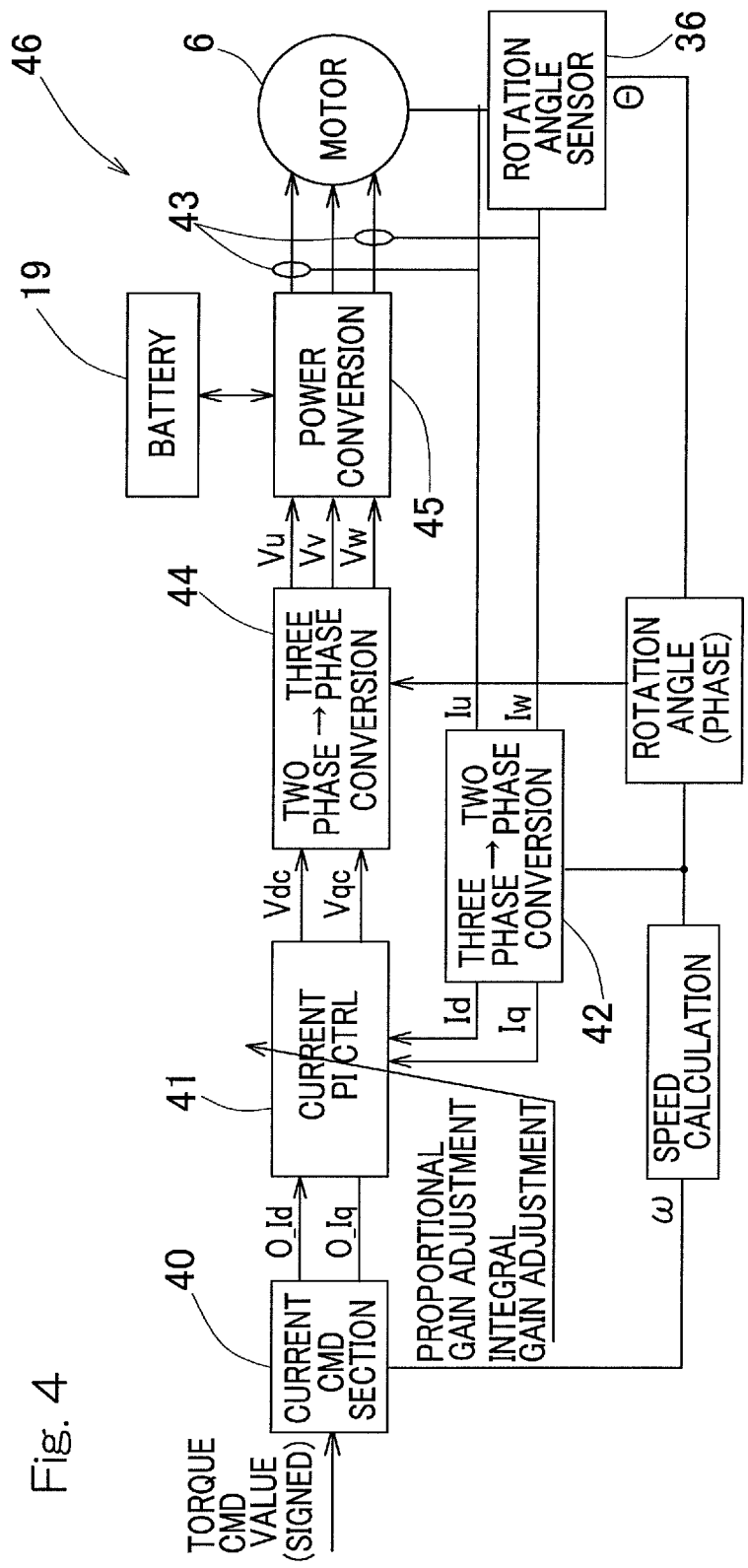
FIG. 4 is a detailed block diagram of a current control unit shown in FIG. 3.

FIG. 3 is a block diagram of a torque control system, wherein the control gain adjustment section 34 of the motor control module 29 in the inverter device 22 is shown. FIG. 4 is a detailed block diagram of a current control unit 46 shown in FIG. 3. A description will be given with reference to FIGS. 3 and 4. The motor control module 29 in FIG. 3 is configured to control a motor drive current and includes a current command section 40 shown in FIG. 4. In addition, the motor control module 29 includes the current PI control section 41. The current command section 40 generates an appropriate command current by using the torque table (not shown), which is preset in the inverter 31 of the inverter device 22, on the basis of a detection value of a drive current which is applied to the motor 6 and is detected by the rotation angle sensor 36 and a torque command value which is an accelerating/decelerating command which is generated by the torque allocation section 21a of the ECU 21 shown in FIG. 3 and has a sign representing the direction of acceleration/deceleration, that is, the direction of the command current.

Regarding the torque table, an appropriate torque command value is calculated from a maximum torque control table on the basis of an accelerating signal and the rotation speed of the motor 6. As shown in FIG. 4, the current command section 40 generates command values of a primary current (Ia) and a current phase angle (β) (not shown) of the motor 6 on the basis of the calculated torque command value. The current command section 40 generates two command currents, a d-axis current (magnetic field component) O_Id and a q-axis current (torque component) O_Iq, on the basis of the values of the primary current (Ia) and the current phase angle (β).

The current PI control section 41 calculates control variables Vdc and Vqc as voltage values by PI control on the basis of the values of the d-axis current O_Id and the q-axis current O_Iq outputted from the current command section 40 and two-phase currents Id and Iq calculated by a three phase/two phase conversion section 42 using the motor current and the rotor angle, under proportional gain adjustment and integral gain adjustment at the control gain adjustment section 34. The three phase/two phase conversion section 42 calculates a v-phase current (Iv), which is obtained by the following equation, Iv=−(Iu+Iw), on the basis of detection values of a u-phase current (Iu) and a w-phase current (Iw) of the motor 6 which are detected by current sensors 43, and converts the three-phase currents Iu, Iv, and Iw to two-phase currents Id and Iq. The rotor angle of the motor 6 which is used for the conversion is obtained from the rotation angle sensor 36.

The PI control gain adjustment table 35 (FIG. 2) includes two types of PI control gain adjustment tables 35 for power running control and for regenerative control. In each of the PI control gain adjustment tables 35 for power running control and for regenerative control, a PI control gain which is used when the current PI control section 41 performs PI feedback control is set in accordance with a running state. As shown in FIG. 3, the control gain adjustment section 34 adjusts the PI control gain during execution of power running control or regenerative control on the basis of a deviation current value (E_CURR=O_CURR−A_CURR) between a measured current value A_CURR and a command current value O_CURR generated using the torque table, thereby achieving improvement in responsiveness. In FIG. 3, the output of the control gain adjustment section 34 is inputted to a current control block 37 corresponding to the power circuitry 28 shown in FIG. 2.

Only with P control, in general, an offset which is a steady-state deviation from a target value occurs. Thus, in order to eliminate the offset in P control, I control is added, and the motor 6 is controlled until a deviation between a measured value and a target value is eliminated.

Operation amount: $PI=P+I$

Deviation of motor current: $E\_CURR=O\_CURR-A\_CURR$ ($O\_CURR$ is a command current value of the motor, and $A\_CURR$ is a measured current value of the motor.)

P manipulation amount: $P=Kp \times E\_CURR$ ($Kp$ is a proportional gain.)

I manipulation amount: $I=I+Ki \times E\_CURR$ ($Ki$ is an integral gain.)

The above current is an effective value of the motor phase current.

Automatic adjustment rules for PI control gain:

Rules for automatically adjusting the PI control gain are set as follows.

1. As the absolute value |E_CURR| of the deviation between the measured current value and the command current value of the motor decreases, the integral gain Ki and the proportional gain Kp are decreased. This can suppress overshoot in current control.

2. On the other hand, as the absolute value |E_CURR| of the deviation between the measured current value and the command current value of the motor 6 increases, the integral gain Ki and the proportional gain Kp are increased. This makes the responsiveness of the motor 6 quicker.

The PI control gain adjustment table 35 is created according to the automatic adjustment rules. The PI control gain adjustment table 35 is recorded, for example, in a ROM which is a storage or memory provided in the inverter device 22. The motor control module 29 takes the value of the PI control gain from the PI control gain adjustment table 35 and controls the motor 6. The PI control gain adjustment tables 35 for power running control and for regenerative control are provided for each interval (e.g., 5 km/h) determined by regarding a vehicle speed.

As shown in FIG. 4, the control variables Vdc and Vqc which are calculated by the current PI control section 41 are inputted to a two phase/three phase conversion section 44. The two phase/three phase conversion section 44 convers the inputted two-phase control variables Vdc and Vqc to three-phase PWM duties Vu, Vv, and Vw using a rotor angle θ of the motor 6 obtained by the rotation angle sensor 36. A power conversion section 45 corresponds to the power circuitry 28 in FIG. 2, and PWM control of the inverter 31 (FIG. 2) is performed in accordance with the PWM duties Vu, Vv, and Vw, and three-phase drive currents which drive the motor 6 are outputted.

Figure 5:
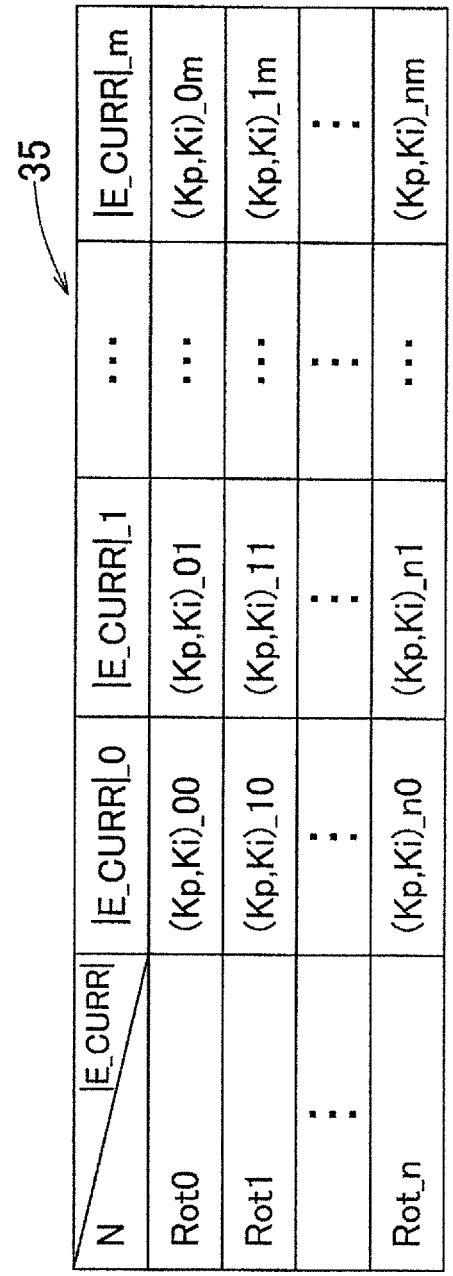
FIG. 5 is a diagram showing a PI control gain adjustment table in a control device for the electric vehicle.

FIG. 5 is a diagram showing the PI control gain adjustment table 35 in the control device for the electric vehicle. In FIG. 5, a horizontal row indicates the absolute value |E_CURR| of the deviation between the measured current value and the command current value of the motor, and a vertical column indicates a vehicle speed N. Two types of PI control gain adjustment tables 35 are provided individually for power running control and for regenerative control. Since the two types of PI control gain adjustment tables 35 are provided individually for power running control and for regenerative control as described above, for example, disturbance caused due to a distinction in performance or a deterioration state of the battery 19, a distinction in loss of the motor 6 and the inverter device 22, or the like, is less influential, and it is possible to accurately control the motor 6 regardless of power running control or regenerative control. Thus, it is possible to finely control the motor 6. Therefore, it is possible to improve the responsiveness of the motor 6.

Figure 6:
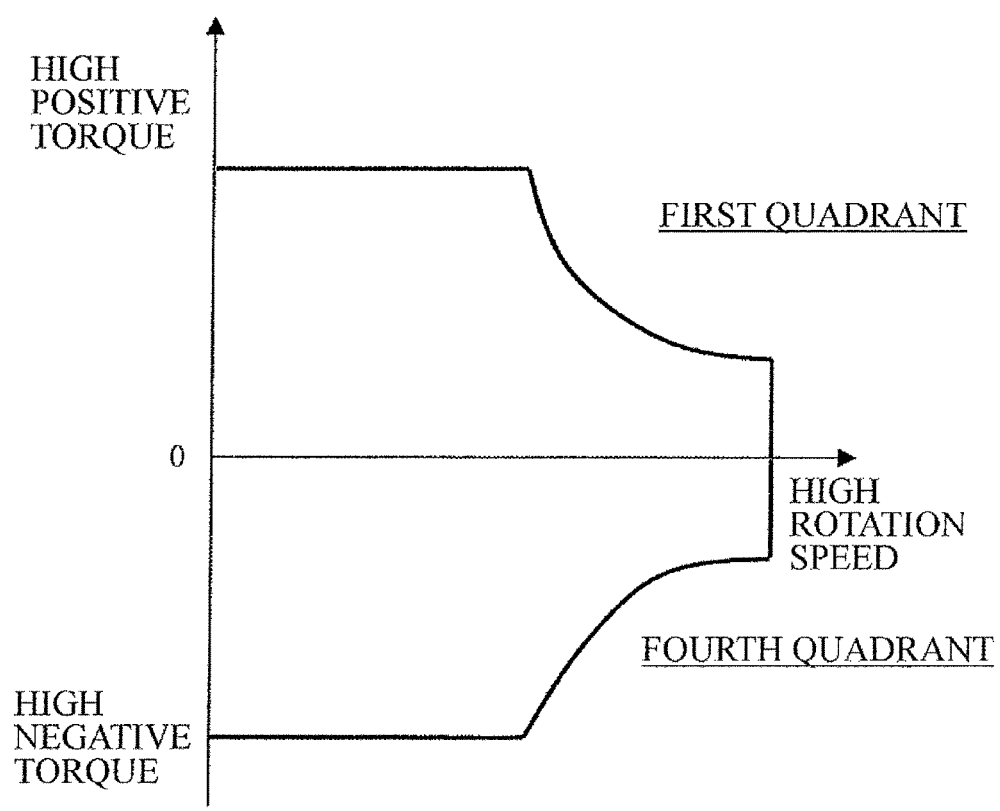
FIG. 6 is an N-T chart of a motor in the electric vehicle.

FIG. 6 is an N-T (rotation speed-torque) chart of the motor in the electric vehicle. FIG. 6 shows the first quadrant and the fourth quadrant of the N-T chart of the motor. The first quadrant is an area in which power running control is performed, and positive torque occurs therein. The fourth quadrant is an area in which regenerative control is performed, and negative torque occurs therein.

Figure 7B:
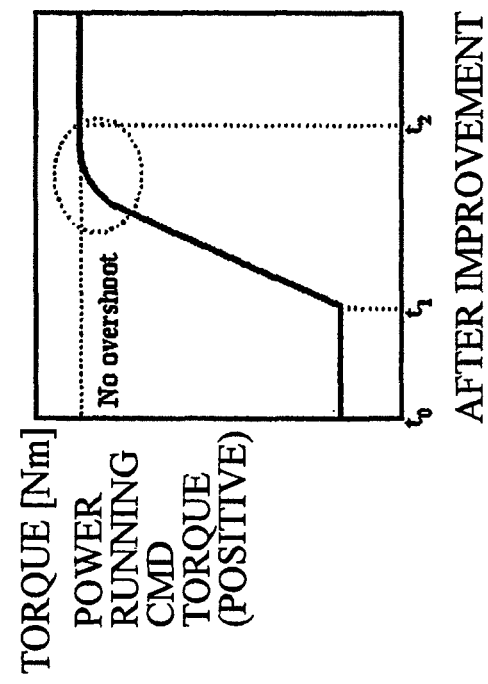
Figure 7B:
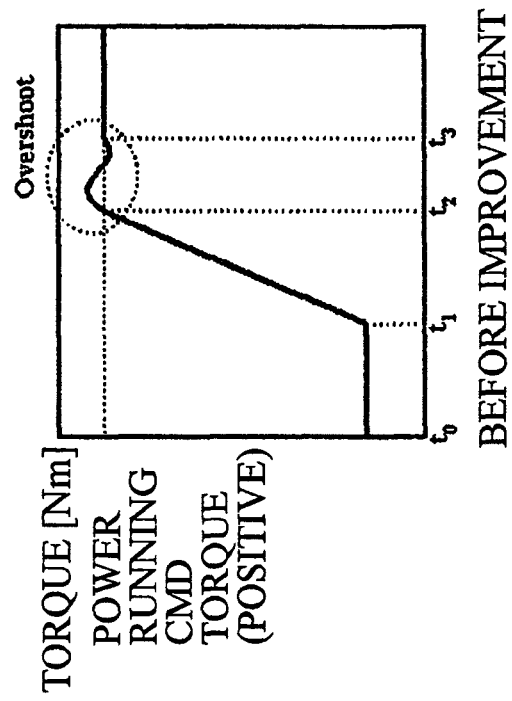
Figure 8B:
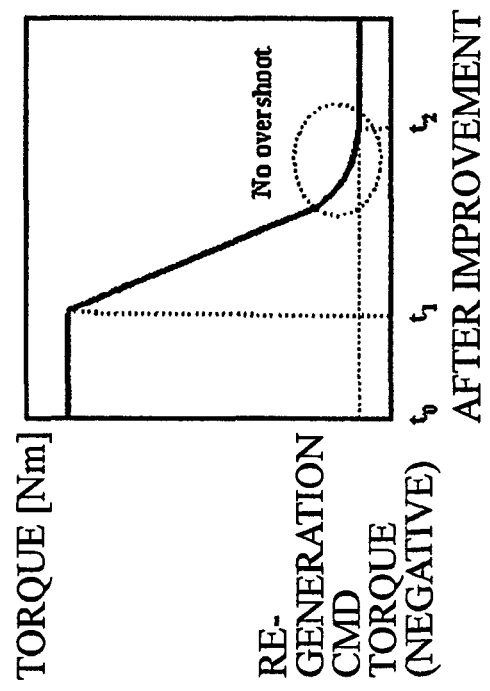
Figure 8B:
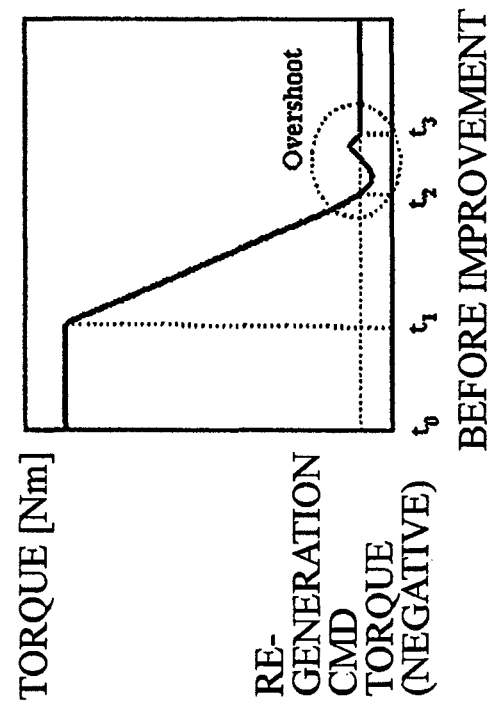

FIGS. 7A and 7B are diagrams showing an example before and after improvement in overshoot during power running control. FIG. 7A is related to the conventional art, in which overshoot that the torque exceeds a command torque occurs during power running control. On the other hand, in FIG. 7B, improvement in overshoot mentioned above is achieved by using the control device according to the present embodiment. FIGS. 8A and 8B are diagrams showing an example before and after improvement in overshoot during regenerative control. FIG. 8A is related to the conventional art, in which overshoot that the torque exceeds a command torque occurs during regenerative control. On the other hand, in FIG. 8B, improvement in overshoot mentioned above is achieved by using the control device according to the present embodiment.

Function and advantageous effects will be described. The motor control module 29 controls the power circuitry 28 on the basis of the accelerating/decelerating command, which is the torque command or the like sent from the ECU 21, during motor power running and regenerative control, and executes output of the motor 6 through torque control. That is, the current PI control section 41 in the motor control module 29 performs PI feedback control so as to eliminate a deviation relative to the command current value generated in the inverter, in response to the torque command from the ECU 21. Since the PI control gain adjustment tables 35 which are used during the PI feedback control are provided for power running control and for regenerative control, respectively, disturbance caused due to a distinction in performance or a deterioration state of the battery 19, a distinction in loss of the motor 6 and the inverter device 22, or the like, is less influential, and it is possible to more accurately control the motor 6 regardless of power running control or regenerative control. Therefore, it is possible to improve the responsiveness of the motor 6.

The control gain adjustment section 34 adjusts the PI control gain of the current PI control section 41 according to the PI control gain adjustment table 35 such that the PI control gain corresponding to the running state is used. Since the PI control gain is optimally adjusted in accordance with the running state which changes every moment, an overshoot phenomenon can be avoided to, for example, suppress vibration of the reducer and the like. Thus, it is possible to improve the occupant's riding comfort.

As for the PI control gain adjustment table 35, as the absolute value of the deviation (the deviation current value E_CURR) between the measured current value A_CURR and the command current value O_CURR of the motor 6 decreases, the integral gain in the PI control gain is decreased, and the proportional gain is decreased at the same time. In addition, as the absolute value of the deviation mentioned above increases, the integral gain is increased, and the proportional gain is increased at the same time. The PI control gain adjustment table 35 is set as described above on the basis of results of an actual vehicle test, or the like. Since the integral gain and the proportional gain are decreased as the absolute value of the deviation mentioned above decreases, it is possible to suppress overshoot in current control. On the other hand, since the integral gain and the proportional gain are increased as the absolute value of the deviation mentioned above increases, it is possible to make the responsiveness of the motor 6 quicker. As described above, it is possible to achieve both suppression of overshoot in current control and improvement of the responsiveness of the motor 6.

By the control gain adjustment section 34, a limit may be provided for a gain manipulation amount for manipulating the proportional gain or the integral gain. If the gain manipulation amount exceeds the limit, the control gain adjustment section 34 may use the limit as an upper limit. In this case, for example, it is possible to prevent an excessively large current from flowing to the PWM driver 32 of the power circuitry 28, thereby preventing abnormality occurrence of the inverter device 22. For a command current value which corresponds to the value of current flowing to the motor 6 during power running control or the value of current flowing to the motor 6 during regenerative control, a limit may be provided. In this case, for example, it is possible to reduce influence of disturbance or temperature rise of the motor 6. Therefore, it is possible to prevent abnormality occurrence of the motor 6 which is caused due to temperature rise of the motor 6 or the like.

In the above-described embodiment, the case of application to an electric vehicle whose rear wheels are driven by the in-wheel motor devices has been described. However, in another embodiment, the present invention is also applicable to an electric vehicle whose wheels are driven by motors disposed outside the wheels, such as an on-board type, in addition to an in-wheel motor type. Furthermore, the present invention is applicable to an electric vehicle whose four wheels are driven by respective motors, or an electric vehicle whose wheels are driven by a single motor.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included within the scope.

REFERENCE NUMERALS

4 . . . wheel bearing
6 . . . motor
7 . . . reducer
21 . . . ECU
22 . . . inverter device
28 . . . power circuitry
29 . . . motor control module
31 . . . inverter
34 . . . control gain adjustment section
35 . . . PI control gain adjustment table
41 . . . current PI control section

What is claimed is:

1. A control device for an electric vehicle having a motor to drive a wheel through a reducer, the control device including:
   an electric control unit (ECU) configured to perform general control of the vehicle, the ECU including a torque allocation section configured to generate a power running/regeneration command and a power running/regenerative control command section configured to send a command flag for switching between power running and regeneration based on a user input to the vehicle; and
   an inverter device configured to perform control of the motor, the inverter device including power circuitry with a pulse width modulation (PWM) driver and an inverter configured to convert a direct current (DC) power to an alternating current (AC) power used to drive the motor, and a motor control module configured to control the power circuitry in accordance with control of the ECU,
   wherein the motor control module comprises
      a motor power running/regenerative control section configured to generate a command current value in accordance with the power running/regeneration command and the command flag direction sent by the ECU by using a torque table which is preset in the inverter;

a current proportional and integral (PI) control section configured to perform PI feedback control so as to eliminate a deviation relative to the command current value generated in the motor power running/regenerative control section, in response to a torque command from the ECU, by using PI control gain adjustment tables, for power running control and for regenerative control, in which a PI control gain used when the current PI control section performs the PI feedback control is set in accordance with a running state; and a control gain adjustment section configured to adjust the PI control gain of the current PI control section according to the PI control gain adjustment tables such that the PI control gain corresponding to the running state is used.

2. The control device for the electric vehicle as claimed in claim 1, wherein the respective PI control gain adjustment tables for power running control and for regenerative control are provided for a preset interval determined with respect to a vehicle speed.

3. The control device for the electric vehicle as claimed in claim 1, wherein, in each of the PI control gain adjustment tables, as an absolute value of a deviation between the command current value and a measured current value of the motor decreases, an integral gain in the PI control gain is decreased, and a proportional gain is decreased at the same time; and as the absolute value of the deviation increases, the integral gain is increased, and the proportional gain is increased at the same time.

4. The control device for the electric vehicle as claimed in claim 1, wherein a limit is provided by the control gain adjustment section for a gain manipulation amount for manipulating the proportional gain or the integral gain, and if the gain manipulation amount exceeds the limit, the gain adjustment section uses the limit as an upper limit.

5. The control device for the electric vehicle as claimed in claim 1, wherein a limit is provided for a command current value which corresponds to a value of current flowing to the motor during power running control or of current flowing to the motor during regenerative control.

* * * * *